US010994415B2

(12) United States Patent
Haddadin

(10) Patent No.: US 10,994,415 B2
(45) Date of Patent: May 4, 2021

(54) ROBOT WITH CONTROL SYSTEM FOR DISCRETE MANUAL INPUT OF POSITIONS AND/OR POSES

(71) Applicant: FRANKA EMIKA GmbH, Munich (DE)

(72) Inventor: Sami Haddadin, Hannover (DE)

(73) Assignee: FRANKA EMIKA GMBH, München (DE)

( * ) Notice: Subject to any disclaimer, the term of this patent is extended or adjusted under 35 U.S.C. 154(b) by 470 days.

(21) Appl. No.: 15/773,630

(22) PCT Filed: Oct. 25, 2016

(86) PCT No.: PCT/EP2016/075674
§ 371 (c)(1),
(2) Date: May 4, 2018

(87) PCT Pub. No.: WO2017/076697
PCT Pub. Date: May 11, 2017

(65) Prior Publication Data
US 2019/0061148 A1 Feb. 28, 2019

(30) Foreign Application Priority Data
Nov. 4, 2015 (DE) .................... 10 2015 118 918.6

(51) Int. Cl.
*B25J 9/16* (2006.01)
*G05B 19/423* (2006.01)

(52) U.S. Cl.
CPC ............ *B25J 9/163* (2013.01); *B25J 9/1633* (2013.01); *B25J 9/1656* (2013.01); *B25J 9/1664* (2013.01);
(Continued)

(58) Field of Classification Search
CPC ........ B25J 9/163; B25J 9/1656; B25J 9/1633; B25J 9/1664; G05B 19/423;
(Continued)

(56) References Cited

U.S. PATENT DOCUMENTS 5,980,082 A    11/1999   Watanabe et al.
9,272,417 B2 *   3/2016   Konolige ............. B25J 15/0616
(Continued)

FOREIGN PATENT DOCUMENTS

CN     1205934 A    1/1999
CN     1831468 A    9/2006
(Continued)

OTHER PUBLICATIONS

Conkur, "Path Planning Using Potential Fields for Highly Redundant Manipulators", Robotics and Autonomous Systems, vol. 52, Issues 2-3, pp. 209-228, Aug. 31, 2005.
(Continued)

*Primary Examiner* — Masud Ahmed
(74) *Attorney, Agent, or Firm* — Moser Taboada

(57) ABSTRACT

The invention relates to a robot, a robot control system, and a method for controlling a robot. The robot comprises a movable, multi-membered robot structure (102) that can be driven by means of actuators (101), at least one marked structural element S being defined on the movable robot structure (102), with at least one point $P_S$ marked on the structural element S. The robot is designed such that, in an input mode, it learns positions $POS_{PS}$ of the point PS and/or poses of the structural element S in a work space of the robot, the user exerting an input force $F_{EING}$ on the movable robot structure in order to move the structural element S, which is conveyed to the point $P_S$ as $F_{EING,PS}$, and/or to the structural element S as torque $M_{EING,S}$. A control device
(Continued)

(103) of the robot is designed such that, in the input mode, the actuators (101) are controlled on the basis of a pre-defined space-fixed virtual 3D grid that at least partially fills the work space, such that the structural element S is moved with a pre-defined force $F_{GRID}$ ($POS_{PS}$), according to the current position $POS_{PS}$ of the point $P_S$ in the 3D grid, to the adjacent grid point of the 3D grid or in a grid point space defined around the adjacent grid point of the 3D grid, the point $P_S$ of the structural element S remaining on said adjacent grid point or in said grid point space in the event of the following holding true: $|F_{EING,PS}| < |F_{GRID}(POS_{PS})|$ and/or, in the input mode, the actuators (101) are controlled on the basis of a pre-defined virtual discrete 3D orientation space O, where the 3D orientation space O=: $(\alpha_i, \beta_j, \gamma_k)$ where i=1, 2, ..., I, j=1, 2, ... J, k=1, 2, ..., K is defined or can be defined by a pre-defined angle $\alpha_i, \beta_j, \gamma_k$, in such a way that the structural element S is moved with a pre-defined torque)(SO ROM according to the current orientation $OR_S$ of the structural element, towards the adjacent discrete orientation of the 3D orientation space O=: $(\alpha_i, \beta_j, \gamma_k)$, S, the structural element remaining in said adjacent discrete orientation of the 3D orientation space O in the event that the following holds true: $|M_{EING,S}| < |M_O(OR_S)|$.

18 Claims, 1 Drawing Sheet

(52) U.S. Cl.
CPC .. G05B 19/423 (2013.01); *G05B 2219/36427* (2013.01); *G05B 2219/36433* (2013.01); *G05B 2219/40471* (2013.01); *G05B 2219/40472* (2013.01); *G05B 2219/40474* (2013.01); *Y02P 90/02* (2015.11)

(58) Field of Classification Search
CPC ........... G05B 2219/36427; G05B 2219/40472; G05B 2219/36433; G05B 2219/40471; G05B 2219/40474; Y02P 90/02
See application file for complete search history.

(56) References Cited

U.S. PATENT DOCUMENTS

| | | | |
|---|---|---|---|
| 2011/0015649 A1* | 1/2011 | Anvari | A61B 34/20 606/130 |
| 2014/0025197 A1* | 1/2014 | Mattern | B25J 13/08 700/218 |
| 2015/0081098 A1 | 3/2015 | Kogan | |
| 2015/0331415 A1* | 11/2015 | Feniello | G05B 19/425 700/257 |
| 2017/0021500 A1* | 1/2017 | Davis | B25J 9/1664 |
| 2017/0160721 A1 | 6/2017 | Gombert et al. | |

FOREIGN PATENT DOCUMENTS

| | | |
|---|---|---|
| CN | 102216860 A | 10/2011 |
| CN | 102601684 A | 7/2012 |
| CN | 102785246 A | 11/2012 |
| CN | 104457566 A | 3/2015 |
| DE | 3606685 C2 | 11/1988 |
| DE | 4408982 C1 | 5/1995 |
| EP | 0440588 A1 | 8/1991 |
| JP | H01175608 A | 7/1989 |
| JP | 1999-254361 | 9/1998 |
| JP | 2002-73130 | 3/2002 |
| JP | 2009-297853 | 12/2009 |
| JP | 2017-504494 | 2/2017 |
| WO | WO-2015113757 A1 | 8/2015 |

OTHER PUBLICATIONS

Biagiotti et al., "A Multimodal Haptic Mouse for Visually Impaired People", Proceedings Enactive, Nov. 17, 2005.
International Search Report dated Jan. 20, 2017 for PCT Application No. PCT/EP2016/075674.
International Preliminary Report on Patentability dated May 17, 2018 for PCT Application No. PCT/EP2016/075674.

\* cited by examiner

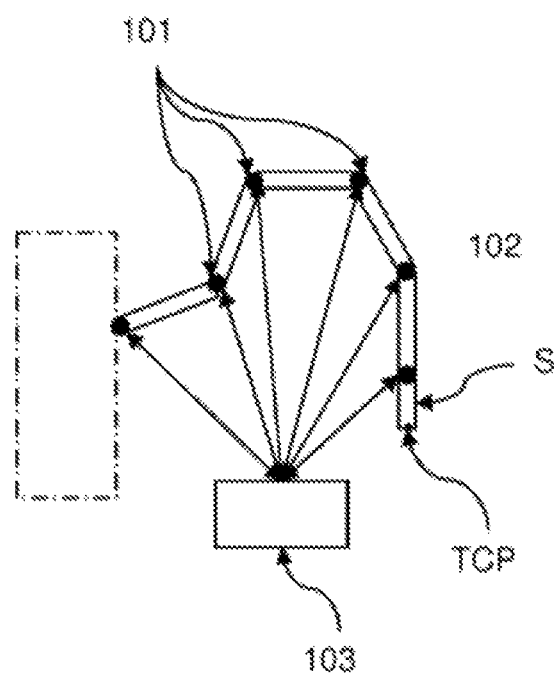

ROBOT WITH CONTROL SYSTEM FOR DISCRETE MANUAL INPUT OF POSITIONS AND/OR POSES

The present invention refers to a robot having a movable, multi-membered robot structure that can be driven by means of actuators, in particular a robot arm, wherein the robot is adapted and designed in such a way that the robot, in an input mode, learns positions, poses and/or movement sequences of the movable robot structure by moving the robot structure through a user, within a work space of the robot. The learning process is also identified as a so called "teach-in" process.

In particular in modern robots, which interact with humans, positions, poses and/or motion sequences of movable, multi-membered robot structures are often provided to the robot by means of a "teach-in" process. During the "teach-in" process, the actuators of the driven robot structure are typically controlled in such a way that the robot structure is subject to a gravitational force compensation and the robot structure in an associated work space is otherwise essentially freely movable by a human. This typically occurs by means of torque regulation, force regulation or intrinsic driving back capacity of the robot.

In so called "teach-in" processes, a drawback is the limited speed and precision when learning positions, poses and motion sequences of a drivable movable robot structure.

The object of the invention is to provide a robot, which allows an improved "teach-in" process.

The invention is obtained from the characteristics of the independent claims. Advantageous developments and embodiments are defined in the dependent claims. Further characteristics, possible applications and advantages of the invention are provided in the following description, as well as by the explanation of exemplary embodiments of the invention, which are shown in the FIGURES.

A first aspect of the invention refers to a robot having a movable, multi-membered robot structure, which may be driven by actuators, wherein on the movable robot structure at least one marked structure element S with at least one point $P_S$ marked on the structure element S is defined.

The robot is adapted and designed in such a way that the robot, in an input mode, learns positions $POS_{PS}$ of point $P_S$ and/or poses of the structure element S within a work space of the robot, wherein the user, in order to move the structure element S, exerts an input force $\vec{F}_{EING}$, which is conveyed to the point $P_S$ as $\vec{F}_{EING,PS}$ and/or which to the structure element S as torque $\vec{M}_{EING,S}$.

Presently, the term "pose" is intended according to DIN EN ISO 8373. The pose of the structural element S is thus the combination of position and orientation of the structural element S in three-dimensional space.

The robot also has a control device, which is designed and adapted in such a way that in the input mode, the actuators are controlled on the basis of a predefined virtual 3D grid, at least partially filling the work space, in such a way that the structural element S is moved with a predefined force $\vec{F}_{GRID}(POS_{PS})$ according to the current position $POS_{PS}$ of point $P_S$ in the 3D grid to the adjacent grid point or into a volume of grid points defined around the adjacent grid point in the 3D grid, wherein the point $P_S$ of structural element S remains on said adjacent grid point or in said grid point space if the following holds true: $|\vec{F}_{EING,PS}| < |\vec{F}_{GRID}(POS_{PS})|$. The virtual 3D grid may, for instance, be fixed in space or time variable. The definition of the virtual 3D grid may vary autonomously, for example, due to switching conditions or due to an input by the user.

The current position $POS_{PS}$ of point $P_S$ relative to the 3D grid may for example be determined by means of a sensor system for detecting a current pose of the mobile robot structure or by evaluating the control parameters for controlling the actuators. Corresponding devices and methods are known in the art. The current position $POS_{PS}$ of point $P_S$ relative to the 3D grid is determined by a sensor system for determining the current pose of the mobile robot structure and a CAD data set of the robot structure and/or a surface model of the robot structure.

The current position $POS_{PS}$ of point $P_S$ in the 3D grid may be, according to the manual movement of the structural element S by the user, a position, which is between the grid points of the 3D grid, so that the force $\vec{F}_{GRID}(POS_{PS})$ predetermined for the 3D grid advantageously leads to an almost "raster" translational input of positions $POS_{PS,Eing}$ of point $P_S$ in work space, whenever the current position $POS_{PS}$ of point $P_S$ does not correspond to a grid point of the 3D grid or lies within a volume of grid points of the 3D grid, the actuators of the robot structure are controlled in such a way that the point $P_S$ is moved to the adjacent grid point or into the adjacent volume of grid points.

As an alternative, when the current position $POS_{PS}$ of point $P_S$ is set at the center of a symmetrical potential, wherein the forces $\vec{F}_{GRID}(POS_{PS})$ compensate each other, the point $P_S$ will remain in this position. By manual input by the user, the point $P_S$ may then be displaced in the direction of the adjacent grid point.

The storage of a position $POS_{PS,Eing}$ of point $P_S$ in a "teach-in" process advantageously only occurs when the position $POS_{PS}$ of point $P_S$ corresponds to a grid point of the 3D grid or the position $POS_{PS}$ of point $P_S$ is within a previously defined grid volume. The point $P_S$ almost locks into the grid points of the 3D grid or into the grid volumes of the 3D grid. Thus, the input or storage of positions $POS_{PS,Eing}$ of point $P_S$ is advantageously only possible with a spatial resolution corresponding to the predetermined 3D grid.

The storage or input of a position $POS_{PS,Eing}$ of point $P_S$ in a "teach-in" process advantageously occurs, even when the point $P_S$ is at a grid point or within a grid volume of the 3D grid, only when an input means connectable or connected to the robot is actuated by the user. This input means may be a key, for example.

If the value of force $|\vec{F}_{EING,PS}|$ which is transmitted by a user to point $P_S$ when moving the robot structure, is larger than the value of the predetermined force $|\vec{F}_{GRID}(POS_{PS})|$, then the structural element or the robot structure may be moved in a translational way. If the value of force $|\vec{F}_{EING,PS}|$, which is transmitted by a user to point $P_S$ in case of a movement of the robot structure, is smaller than the value of the predetermined force $|\vec{F}_{GRID}(POS_{PS})|$, then the structural element S or the robot structure cannot be moved, or only within a predetermined area, and point $P_S$ remains at the adjacent grid point or within the corresponding grid volume of the 3D grid.

The term "3D grid" refers, in this case, to any 3D grid. The 3D grid may in particular be structured or unstructured, regular or irregular, orthogonal or non-orthogonal. In particular, the density of grid points of the 3D grid may vary spatially. The grid points of the 3D grid may vary with time t, i.e. the 3D grid is time variable.

As an alternative or additionally, the control device is designed and adapted in such a way that, in the input mode, the actuators are controlled according to a predetermined virtual discrete 3D-orientation space O, wherein the 3D orientation space O=: $(\alpha_i, \beta_j, \gamma_k)$ wherein i=1, 2, ..., I, j=1, 2, ... J, k=1, 2, ..., K is or may be defined by predetermined angles $\alpha_i, \beta_j, \gamma_k$ such that the structural element S is moved by means of a torque $\vec{M}_o(\vec{OR}_S)$ predetermined by the current orientation $\vec{OR}_S$ of the structural element to the adjacent discrete orientation of the 3D orientation space O=: $(\alpha_i, \beta_j, \gamma_k)$, wherein the structural element S remains in this adjacent discrete orientation of the 3D orientation space O, if the following relationship is fulfilled: $|\vec{M}_{EING,S}| < |\vec{M}o(\vec{OR}_S)|$.

The predetermined orientation space O=: $(\alpha_i, \beta_j, \gamma_k)$ is characterized in that it sets discrete orientations, which are defined or may be defined for example by predetermined discrete angles $\alpha_i, \beta_j, \gamma_k$ or angular combinations. The current orientation $\vec{OR}_S = \alpha, \beta, \gamma$ of structural element S is typically an orientation between the predetermined discrete orientations of the 3D orientation space O=: $(\alpha_i, \beta_j, \gamma_k)$.

The torque $\vec{M}_o(\vec{OR}_S)$ generates no translation of the structural element S, but a new orientation of the structural element S. In other words, the torque $\vec{M}_o(\vec{OR}_S)$ causes a new orientation from any orientation $\vec{OR}_S = \alpha, \beta, \gamma$ of structural element S to the adjacent discrete orientation $\vec{ON}(\vec{OR}_S)=(\alpha_i, \beta_j, \gamma_k)$ of orientation space O. The metric used as a base, which in the present case defines the "adjacency", may be freely selected and may for example vary according to the orientation representation.

The current orientation $\vec{OR}_S$ of the structural element S with respect to the discrete 3D orientation space O may for example be determined by a sensor system for detecting a current orientation of structural element S or by evaluation of control parameters for controlling the actuators of the robot element. Corresponding devices and methods are known in the art.

The current orientation $\vec{OR}_S$ of structural element S relative to discrete 3D orientation space O may be, according to the manual movement of the structural element S by a user, an orientation, which lies between the discrete orientations of the 3D orientation space O, so that the torque $\vec{M}_o(\vec{OR}_S)$ advantageously gives rise to an almost "raster" orientation input in the work space, whenever the current orientation $\vec{OR}_S$ of structural element S does not correspond to a discrete orientation of the 3D orientation space, the actuators of the robot structure are controlled in such a way that the structure element S is moved or is oriented into the adjacent discrete orientation $\vec{ON}(\vec{OR}_S)$ of the 3D orientation space O=: $(\alpha_i, \beta_j, \gamma_k)$.

In an advantageous embodiment, a plurality of structural elements $S_i$ of the movable robot structure and/or correspondingly associated points $P_{S,i}$ are defined, which are taken into account by the control device according to above said circumstances. This allows in particular a discrete input of poses and motion sequences of the entire movable robot structure.

All in all, the proposed robot allows, in the context of a "teach-in" process, a discrete and thus accurate input of positions, translations and/or rotations of the structural element or poses and/or movements of the structural element in an associated frame of reference. In particular a haptic feedback is provided to the "inputting" person (user), which advantageously emulates a linear or non-linear spring effect with a linear or non-linear damping effect which may be adjusted depending on needs, between the structural element S or point $P_S$ and the adjacent 3D grid point or the adjacent discrete orientation $\vec{ON}(\vec{OR}_S)$ of the 3D orientation space. In absence of external forces or torques acting on the robot element or the structural element S, point $P_S$ or structural element S "snaps" into the adjacent 3D grid point or in the adjacent 3D grid point volume or in the adjacent discrete orientation $\vec{ON}(\vec{OR}_S)$ of the 3D orientation space O.

Advantageously, the increments (step width) for the discrete input of translations and/or rotations/orientations may be set variably. In other words, the grid distances in the 3D grid or the discrete angles $\alpha_i, \beta_j, \gamma_k$ of the 3D orientation space O may advantageously be set variably.

Such a robot allows in particular a fast, precise and repetitive input of positions, poses or sequences of movements of the movable robot structure.

The robot structure is advantageously a robot arm, in particular a multi-member robot arm. The structural element S may essentially be a part of the robot arm. Advantageously, the structural element S is an end effector of a robot arm. The robot structure may comprise branching movable elements, such as a robot hand. The robot structure may comprise non-actuating driven structural members.

In an embodiment of the proposed robot, the structural element S is the end effector of a robot arm and point $P_S$ is the so called "tool center" point TCP of the end effector. In this embodiment, a discrete and thus accurate input of positions and translations of "tool center" point TCP is thus possible.

The predetermined force $\vec{F}_{GRID}(POS_{PS})$ varies periodically within the 3D grid. The force $\vec{F}_{GRID}(POS_{PS})$ virtually engages position $P_S$ of structural element S and depends, in particular, on the current position $POS_{PS}$ of point $P_S$ in the 3D grid. Obviously, the predetermined force $\vec{F}_{GRID}(POS_{PS})$ in the 3D grid may also be set, according to requirements and application, in an aperiodic way or in a mixed form (periodic and aperiodic) in the work space of the robot.

Advantageously, a maximum value $|\vec{F}_{GRID}|_{max}$ and/or a minimum value $|\vec{F}_{GRID}|_{min}$ of force $\vec{F}_{GRID}(POS_{PS})$ is set for the entire 3D grid or selected regions thereof, so that the following holds: $|\vec{F}_{GRID}|_{min} < |\vec{F}_{GRID}(POS_{PS})| < |\vec{F}_{GRID}|_{max}$. The maximum value $|\vec{F}_{GRID}|_{max}$ and/or the minimum value $|\vec{F}_{GRID}|_{min}$ are chosen such that an involuntary or unmotivated input or movement of point $P_S$ may be avoided, and at the same time the value $|F_{EING,PS}|$ of the input force $\vec{F}_{EING}(P_S)$ required for moving point $P_S$ by the user is perceived as comfortable, wherein a movement of point $P_S$ always requires that: $|\vec{F}_{EING,PS}| > |\vec{F}_{GRID}(POS_{PS})|$.

Advantageously, the grid points of the 3D grid and/or the distances of grid points in the 3D grid may be variably set by means of an input device of the robot, for example individually or for regions of the work space of the robot. In particular, spatial regions of the work space of the robot may be provided, for achieving a higher resolution, in individual spatial regions, with a denser 3D grid (i.e. more grid points per volume unit) than in other regions. The robot advantageously comprises an input device with access to a storage unit, in which the various 3D grids are stored, which may be selected through the input device.

Advantageously, the force $\vec{F}_{GRID}(POS_{PS})$ may be set in a variable way by means of an input device. For example, the force $\vec{F}_{GRID}(POS_{PS})$ may be set for positions $POS_{PS}$ within a unit cell of the 3D grid and may be transferred to the 3D grid or partial regions of the work space.

The control device is advantageously configured and designed so that if at least two adjacent grid points or grid point volumes of the 3D grid are positioned at the same distance from the current position $POS_{PS}$ of point $P_S$ in the 3D grid, one of these grid points/volumes is selected as the adjacent grid point/volume according to a predefined method. Such a decision may occur based on a random algorithm, i.e. in a statistical way. Obviously, different selection algorithms may be used according to the specific application.

Advantageously, the control device is embodied and set up in such a way that a virtual 3D potential field is defined in the work space whose local minima are identical to the grid points of the 3D grid, wherein the force $\vec{F}_{GRID}(POS_{PS})$ is determined resulting from the negative gradient of this potential field. The potential field can be specified according to task and application.

Advantageously, the local minima of the 3D potential field have a constant potential around each grid point of the 3D grid in a given spatial area, wherein the predetermined spatial area has a greatest extent that is smaller than the grid spacing between two adjacent grid points of the 3D grid.

Advantageously, a maximum amount $|\vec{M}_O|_{max}$ and/or a minimum amount $|\vec{M}_O|_{min}$ of the predetermined torque $\vec{M}_O(\vec{OR}_S)$ is set for the 3D orientation space O or selected ranges thereof, so that: $|\vec{M}_O|_{min}<|\vec{M}_O(\vec{OR}_S)|<|\vec{M}_O|_{max}$. The maximum amount $|\vec{M}_O|_{max}$ and/or the minimum amount $|\vec{M}_O|_{min}$ of torque $\vec{M}_O(\vec{OR}_S)$ can advantageously be variably predetermined by the respective user via an input means of the robot. Advantageous $|\vec{M}_O|_{max}$ and/or $|\vec{M}_O|_{min}$ are such that accidental or unmotivated reorientations of the structure element S are avoided, and at the same time the value $|\vec{M}_{EING}(\vec{OR}_S)|$ of the required torque $\vec{M}_{EING}(\vec{OR}_S)$ for a reorientation of the structural element S is perceived by the user to be pleasant, wherein a reorientation of the structural element S always requires: $|\vec{M}_{EING}(\vec{OR}_S)|>|\vec{M}_O(\vec{OR}_S)|$.

In an embodiment of the robot, the orientation space $O=: (\alpha_i, \beta_j, \gamma_k)$ is defined as a function of the current position $POS_{PS}$ of the point $P_S$:

$$O=O(POS_{PS})=(\alpha_i(POS_{PS}),\beta_j(POS_{PS}),\gamma_k(POS_{PS})).$$

This allows the specification different discrete orientation spaces depending on the position $POS_{PS}$ of the point $P_S$ in the work space.

Advantageously, the robot comprises an input device by means of which distances of the grid points of the 3D grid can be variably predetermined.

Advantageously, the robot comprises an input device by means of which discrete angles $\alpha_i, \beta_j, \gamma_k$ of the orientation space O can be variably predetermined.

Advantageously, the control device is embodied and configured such that, in the event that at least two adjacent orientations $O=: (\alpha_i, \beta_j, \gamma_k)$ have the same differences from the current orientation $\vec{OR}_S$ of the structural element S, one of these orientations $O=: (\alpha_i, \beta_j, \gamma_k)$ is selected according to a predetermined method.

A further aspect of the invention relates to a method for controlling a robot so which has a movable, multi-membered, robot structure, which may be driven by actuators, wherein at least one marked structural element S with at least one point $P_S$ marked on the structural element is defined on the movable robot structure, and the robot learns, in an input mode, positions $POS_{PS}$ of the point $P_S$ and/or poses of the structural element S in a work space of the robot, wherein the user, for moving the structural element S, exerts an input force $\vec{F}_{EING}$ on the movable robot structure, which is conveyed to the point $P_S$ as $\vec{F}_{EING,PS}$ and/or to the structural element S as a torque $\vec{M}_{EING,S}$.

In the proposed method, the actuators are actuated in the input mode on the basis of a predetermined virtual 3D grid which at least partially fills the work space such that the structural element S is moved by a force $\vec{F}_{GRID}(POS_{PS})$ depending on the current position $POS_{PS}$ of the point $P_S$ in the 3D grid to the adjacent grid point of the 3D grid, or into a volume of grid points defined around the adjacent grid point of the 3D grid, wherein the point $P_S$ of the structural element S remains in this adjacent grid point or in this grid point volume in the case where: $|\vec{F}_{EING,PS}|<|\vec{F}_{GRID}(POS_{PS})|$.

Alternatively or additionally, the actuators in the input mode are controlled based on a predetermined virtual discrete 3D orientation space O, wherein the 3D orientation space $O=: (\alpha_i, \beta_j, \gamma_k)$ with $i=1, 2, \ldots, I$, $j=1, 2, \ldots J$, $k=1, 2, \ldots, K$ is defined or definable by predetermined angles $\alpha_i, \beta_j, \gamma_k$, controlled in such a way that the structural element S is moved by a predetermined torque $\vec{M}_O(\vec{OR}_S)$ depending on the current orientation $\vec{OR}_S$ of structural element S to the adjacent discrete orientation of the 3D orientation space $O=: (\alpha_i, \beta_j, \gamma_k)$, wherein the structural element S remains in this adjacent discrete orientation of the 3D orientation space O in the case where: $|\vec{M}_{EING,S}|<\vec{M}_O(\vec{OR}_S)$.

In the proposed method, a virtual 3D potential field is advantageously defined in the work space, whose local minima are identical to the grid points of the 3D grid, wherein the force $\vec{F}_{GRID}(POS_{PS})$ is determined from the negative gradient of this potential field.

In a further development of the method, the local minima of the 3D potential field have a constant potential in a predetermined space region around each grid point of the 3D grid, wherein the spatial area has a greatest extent, which is smaller than the grid spacing between two adjacent grid points.

In a development of the method, if at least two adjacent orientations $O=: (\alpha_i, \beta_j, \gamma_k)$ have the same differences from the current orientation $\vec{OR}_S$ of the structural element S, one of these orientations $O=: (\alpha_i, \beta_j, \gamma_k)$ is selected according to a predetermined method.

Further developments of the proposed method and the resulting advantages result from an analogous and corresponding transfer of the statements made above for the proposed robot.

Another aspect of the invention relates to a robot controller, wherein the robot controller is configured such that a method as described above is performed on a data processing device.

Another aspect of the invention relates to a computer system having a data processing device, wherein the data processing device is configured such that a method as described above is executed on the data processing device.

A further aspect of the invention relates to a regulation device for controlling a robot, which has a movable, multi-membered robot structure, which may be actuated by means of actuators, wherein on the movable robot structure at least one marked structural element S with at least one point $P_S$ marked on the structural element S is defined, wherein the robot is designed and configured in such a way that the robot learns in input mode positions $POS_{PS}$ of the point $P_S$ and/or poses of the structural element S in a work space of the robot, wherein the user, for moving the structural element S, exerts an input force $\vec{F}_{EING}$ on the movable robot structure, which is conveyed to the point $P_S$ as $\vec{F}_{EING,PS}$ and/or which is conveyed to the structural element S as a torque $\vec{M}_{EING,S}$.

The regulation device comprises a control device which is embodied and set up such that in the input mode the actuators are controlled on the basis of a predetermined virtual 3D grid which at least partially fills the work space such that the structural element S is moved with a predetermined force $\vec{F}_{GRID}(POS_{PS})$ which depends on the current position $POS_{PS}$ of the point $P_S$ in the 3D grid, to the adjacent grid point of the 3D grid or into a volume of grid points defined around the adjacent grid point of the 3D grid, wherein the point $P_S$ of the structural element S remains at the adjacent grid point or in this grid point volume, if: $|\vec{F}_{EING,PS}|<|\vec{F}_{GRID}(POS_{PS})|$, and/or the actuators in the input mode are controlled based on a predetermined virtual discrete 3D orientation space O, wherein the 3D orientation space O=: $(\alpha_i, \beta_j, \gamma_k)$ with i=1, 2, . . . , I, j=1, 2, . . . J, k=1, 2, . . . , K is defined or definable by predetermined angles $\alpha_i$, $\beta_j$, $\gamma_k$, controlled in such a way that the structural element S is moved by a predetermined torque $\vec{M}_O(\vec{OR}_S)$ depending on the current orientation $\vec{OR}_S$ of structural element S to the adjacent discrete orientation of the 3D orientation space O=: $(\alpha_i, \beta_j, \gamma_k)$, wherein the structural element S remains in this adjacent discrete orientation of the 3D orientation space O in the case where: $|\vec{M}_{EING,S}|<|\vec{M}_O(\vec{OR}_S)|$.

Further developments of the proposed regulation device and the resulting advantages result from an analogous and conformal transfer of the above explanations.

The invention further relates to a digital storage medium with electronically readable control signals, wherein the control signals can interact with a programmable computer system such that a method as described above is carried out.

The invention further relates to a computer program product having program code stored on a machine-readable support for carrying out the method, as described above, when the program code is executed on a data processing device.

Finally, the invention relates to a computer program with program codes for carrying out the method, as described above, when the program runs on a data processing device. For this purpose, the data processing device can be designed as any computer system known from the prior art.

Further advantages, features and details emerge from the following description, in which at least one exemplary embodiment is described in detail, if necessary with reference to the drawing. The same, similar and/or functionally identical parts are provided with the same reference numerals.

In the drawings:

FIG. 1 shows a schematic representation of a proposed robot.

FIG. 1 shows a schematic representation of a proposed robot, comprising a movable, multi-membered robot structure 102 that can be driven by means of actuators 101, wherein at least one marked structural element S with at least one point $P_S$ marked on the structural element S is defined on the movable robot structure 102. The robot structure 102 is attached to a robot body (dashed box).

The robot structure 102 is presently a five-membered robot arm 102 at the distal end of which an effector S is arranged. In the present case, the effector S is the structural element S. At the effector S, a so-called "Tool Center Point"=TCP is defined, which is identical to the marked point $P_S=P_{TCP}$.

The robot is designed and set up in such a way that in an input mode the robot can learn positions $POS_{TCP}$ of the TCP and/or poses of the effector S in a work space of the robot, whereby the user, in order to move the effector S, exerts a force $\vec{F}_{EING}$ on the robot arm, which is conveyed to the point $P_{TCP}$ as $\vec{F}_{EING,TCP}$ and/or to the effector as $\vec{M}_{EING,S}$.

The robot further comprises a control device which is embodied and configured in such a way that in the input mode the actuators 101 are controlled on the basis of a predetermined spatially fixed 3D virtual grid which at least partially fills the work space such that the effector S is moved with a given force $\vec{F}_{GRID}(POS_{TCP})$, which is dependent on the current position $POS_{TCP}$ of the tool center point TCP in the 3D grid, to the adjacent grid point of the 3D grid, wherein the point $P_{TCP}$ of the structural element S remains at this adjacent grid point if: $|\vec{F}_{EING,PS}|<|\vec{F}_{GRID}(POS_{PS})|$.

Moreover, the control device is configured in such a way that the actuators in the input mode are controlled based on a predetermined virtual discrete 3D orientation space O, wherein the 3D orientation space O=: $(\alpha_i, \beta_j, \gamma_k)$ with i=1, 2, . . . , I, j=1, 2, . . . J, k=1, 2, . . . , K is defined or definable by predetermined angles $\alpha_i$, $\beta_j$, $\gamma_k$, controlled in such a way that the structural element S is moved by a predetermined torque $\vec{M}_O(\vec{OR}_S)$ depending on the current orientation $\vec{OR}_S$ of structural element S to the adjacent discrete orientation of the 3D orientation space O=: $(\alpha_i, \beta_j, \gamma_k)$, wherein the structural element S remains in this adjacent discrete orientation of the 3D orientation space O in the case where: $|\vec{M}_{EING,S}|<|\vec{M}_O(\vec{OR}_S)|$.

Although the invention has been detailed and explained by means of preferred exemplary embodiments, it is understood that the invention is not limited by the disclosed examples and that other variations may be derived by those skilled in the art, without leaving the protection scope of the invention. It is thus clear that a multiplicity of possible variants exists. It is also clear that the exemplary embodiments only represent examples, which are not intended to limit the protection scope, the possible applications or the configuration of the invention. The previous description and the description of the figures are actually construed in order to allow those skilled in the art to put the exemplary embodiments into practice, wherein those skilled in the art, based on the knowledge of the disclosed inventive idea, may introduce various modifications, for example regarding the functionality or the arrangement of individual elements cited in an exemplary embodiment, without leaving the protection scope, which is defined by the claims and their legal equivalents, as for example in a further explanation of the invention.

REFERENCE LIST 101 actuators
102 movable, multi-membered robot structure
103 control device

The invention claimed is:

1. A robot having a movable, multi-membered robot structure that can be driven by means of actuators, wherein
at least one structural element S is defined on the movable robot structure, with at least one point $P_S$ marked on the structural element S,
the robot is designed such that, in an input mode, the robot learns positions $POS_{PS}$ of the point $P_S$ and/or poses of the structural element S in a work space of the robot, wherein the user exerts an input force $\vec{F}_{EING}$ on the movable robot structure in order to move the structural element S, which force is conveyed to the point $P_S$ as $\vec{F}_{EING,PS}$, and/or to the structural element S as torque $\vec{M}_{EING,S}$,
a virtual 3D grid is defined, that at least partially fills the work space,
a virtual discrete 3D orientation space O is defined, wherein the 3D orientation space O is or can be defined by a triplets of discrete angles: ($\alpha i$, $\beta i$, $\gamma k$), where i=1, 2, ..., I, j=1, 2, ... J, k=1, 2, ..., K, and
a control device of the robot is designed such that,
in the input mode, the actuators are controlled such that the structural element S is moved with a pre-defined force $F_{GRID}(\vec{P}OS_{PS})$, according to the current position $POS_{PS}$ of the point $P_S$ in the 3D grid, to the adjacent grid point of the 3D grid or in a grid point volume defined around the adjacent grid point of the 3D grid,
wherein the point $P_S$ of the structural element S remains on said adjacent grid point or in said grid point volume in the event of the following holding true: $|\vec{F}_{EING,PS}|<|\vec{F}_{GRID}(POS_{PS})|$ and/or,
in the input mode, the actuators are controlled that the structural element S is moved with a predefined torque $M_O(OR_s)$ according to the current orientation $OR_S$ of the structural element, towards the adjacent discrete orientation of the 3D orientation space $\vec{O}=: (\alpha_i, \beta_h, \gamma_k)$,
wherein the structural element S remains in said adjacent discrete orientation of the 3D orientation space $\vec{O}$ in the event that the following holds true: $|\vec{M}_{EING,S}|<|\vec{M}_O(OR_S)|$.

2. The robot of claim 1,
wherein the predetermined force $\vec{F}_{GRID}(POS_{PS})$ periodically varies within the 3D grid.

3. The robot of claim 1,
wherein the control device is designed in such a way that if at least two adjacent grid points or grid point volumes are positioned at the same distance from the current position $POS_{PS}$ of point $P_S$, one of these grid points/grid point volumes is selected as the adjacent grid point/grid point volume according to a predetermined method.

4. The robot of claim 1, wherein the control device is configured in such a way that in the work space a virtual 3D potential field is defined, the local minima of which are identical to the grid points of the 3D grid, wherein the force $\vec{F}_{GRID}(POS_{PS})$ is determined based on the negative gradient of said potential field.

5. The robot of claim 1, wherein the control device is configured in such a way that if at least two adjacent orientations $O=: (\alpha_i, \beta_j, \gamma_k)$ have the same differences with respect to the current orientation $\vec{OR}_S$ of structural element S, one of these orientations $O=: (\alpha_i, \beta_i, \gamma_k)$ is selected according to a predetermined method.

6. The robot of claim 1, wherein the orientation space $O =: (\alpha_i, \beta_i, \gamma_k)$ is defined depending on the current position $POS_{PS}$ of point $P_S$: $O=O(POS_{PS})=(\alpha_i(POS_{PS}), \beta_j(POS_{PS}), \gamma_k(POS_{PS}))$.

7. A method for controlling a robot, which has a movable, multi-membered robot structure, that can be driven by means of actuators, wherein
at least one structural element S is defined on the movable robot structure, with at least one point $P_S$ marked on the structural element S,
the robot, in an input mode, learns positions $POS_{PS}$ of the point $P_S$ and/or poses of the structural element S in a work space of the robot, wherein the user exerts an input force $\vec{F}_{EING}$ on the movable robot structure in order to move the structural element S, which force is conveyed to the point $P_S$ as $\vec{F}_{EING,PS}$, and/or to the structural element S as torque $\vec{M}_{EING,S}$,
a virtual 3D grid is defined, that at least partially fills the work space,
a virtual discrete 3D orientation space O is defined, wherein the 3D orientation space O is or can be defined by a triplets of discrete angles: ($\alpha i$, $\beta i$, $\gamma k$), where i=1, 2, ..., I, j=1, 2, ... J, k=1, 2, ..., K, and
a control device
in the input mode, controls the actuators such that the structural element S is moved with a pre-defined force $\vec{F}_{GRID}(POS_{PS})$, according to the current position $POS_{PS}$ of the point $P_S$ in the 3D grid, to the adjacent grid point of the 3D grid or in a grid point volume defined around the adjacent grid point of the 3D grid,
wherein the point $P_S$ of the structural element S remains on said adjacent grid point or in said grid point volume in the event of the following holding true: $|\vec{F}_{EING,PS}|<|\vec{F}_{GRID}(POS_{PS})|$ and/or,
in the input mode, controls the actuators such that the structural element S is moved with a predefined torque $\vec{M}_O(\vec{OR}_S)$ according to the current orientation $\vec{OR}_S$ of the structural element, towards the adjacent discrete orientation of the 3D orientation space $O=: (\alpha_i, \beta_j, \gamma_k)$, wherein the structural element S remains in said adjacent discrete orientation of the 3D orientation space O in the event that the following holds true: $|\vec{M}_{EING,S}|<\vec{M}_O(\vec{OR}_S)$.

8. The method of claim 7, wherein in the work space a virtual 3D potential field is defined, the local minima of which are identical to the grid points of the 3D grid, wherein the force $\vec{F}_{GRID}(POS_{PS})$ is determined based on the negative gradient of said potential field.

9. The method of claim 7, wherein the local minima of the 3D potential field have a constant potential within a predetermined space region around each grid point of the 3D grid, wherein the space region has a maximum extension which is smaller than the grid spacing between two adjacent grid points.

10. The method of claim 7, wherein, if at least two adjacent orientations have the same difference with respect to the current orientation $OR_s$ of structural element S, one of these orientations $O=: (\alpha_i, \beta_j, \gamma_k)$ is selected according to a predetermined method.

11. The method of claim 8, wherein the local minima of the 3D potential field have a constant potential within a predetermined space region around each grid point of the 3D grid, wherein the space region has a maximum extension which is smaller than the grid spacing between two adjacent grid points.

12. The method of claim 11, wherein, if at least two adjacent orientations have the same difference with respect to the current orientation $OR_s$ of structural element S, one of these orientations $O=: (\alpha_i, \beta_j, \gamma_k)$ is selected according to a predetermined method.

13. The method of claim 8, wherein, if at least two adjacent orientations have the same difference with respect to the current orientation $OR_s$ of structural element S, one of these orientations $O=: (\alpha_i, \beta_j, \gamma_k)$ is selected according to a predetermined method.

14. The method of claim 9, wherein, if at least two adjacent orientations have the same difference with respect to the current orientation OR of structural element S, one of these orientations $O=: (\alpha_i, \beta_j, \gamma_k)$ is selected according to a predetermined method.

15. The robot of claim 2, wherein the control device is designed in such a way that if at least two adjacent grid points or grid point volumes are positioned at the same distance from the current position $POS_{PS}$ of point $P_S$, one of these grid points/grid point volumes is selected as the adjacent grid point/grid point volume according to a predetermined method.

16. The robot of claim 15, wherein the control device is configured in such a way that in the work space a virtual 3D potential field is defined, the local minima of which are identical to the grid points of the 3D grid, wherein the force $\vec{F}_{GRID}(POS_{PS})$ is determined based on the negative gradient of said potential field.

17. The robot of claim 2, wherein the control device is configured in such a way that in the work space a virtual 3D potential field is defined, the local minima of which are identical to the grid points of the 3D grid, wherein the force $\vec{F}_{GRID}(POS_{PS})$ is determined based on the negative gradient of said potential field.

18. The robot of claim 3, wherein the control device is configured in such a way that in the work space a virtual 3D potential field is defined, the local minima of which are identical to the grid points of the 3D grid, wherein the force $\vec{F}_{GRID}(POS_{PS})$ is determined based on the negative gradient of said potential field.

* * * * *